United States Patent
Rogers et al.

(10) Patent No.: US 8,375,020 B1
(45) Date of Patent: *Feb. 12, 2013

(54) METHODS AND APPARATUS FOR CLASSIFYING OBJECTS

(75) Inventors: Kenneth Allen Rogers, Hudson, MA (US); Allen D. Hadden, Marlborough, MA (US); John W. Bruce, Lexington, MA (US); David Giroux, Sharon, MA (US)

(73) Assignee: EMC Corporation, Hopkinton, MA (US)

( * ) Notice: Subject to any disclaimer, the term of this patent is extended or adjusted under 35 U.S.C. 154(b) by 1000 days.

This patent is subject to a terminal disclaimer.

(21) Appl. No.: 11/642,794

(22) Filed: Dec. 20, 2006

Related U.S. Application Data (60) Provisional application No. 60/752,133, filed on Dec. 20, 2005.

(51) Int. Cl.
*G06F 17/30* (2006.01)

(52) U.S. Cl. ........ 707/708; 707/726; 707/737; 707/738; 707/740; 707/754; 707/771

(58) Field of Classification Search .......... 707/705, 707/708, 726, 999.001, 999.003, 999.006, 707/999.007, 737, 738, 740, 754, 771
See application file for complete search history.

(56) References Cited

U.S. PATENT DOCUMENTS

| | | | |
|---|---|---|---|
| 5,438,660 A | 8/1995 | Lee et al. | |
| 5,544,256 A | 8/1996 | Brecher et al. | |
| 5,991,709 A * | 11/1999 | Schoen | 704/1 |
| 6,092,059 A * | 7/2000 | Straforini et al. | 706/14 |
| 6,163,317 A | 12/2000 | de Judicibus | |
| 6,192,360 B1 * | 2/2001 | Dumais et al. | 1/1 |
| 6,220,743 B1 | 4/2001 | Campestre et al. | |
| 6,243,723 B1 * | 6/2001 | Ikeda et al. | 715/210 |
| 6,553,365 B1 | 4/2003 | Summerlin et al. | |
| 6,567,805 B1 * | 5/2003 | Johnson et al. | 707/740 |
| 6,674,725 B2 | 1/2004 | Nabkel et al. | |
| 6,728,689 B1 | 4/2004 | Drissi et al. | |
| 6,823,323 B2 * | 11/2004 | Forman et al. | 706/20 |
| 6,834,287 B1 | 12/2004 | Folk-Williams et al. | |
| 6,938,021 B2 | 8/2005 | Shear et al. | |
| 6,950,864 B1 * | 9/2005 | Tsuchiya | 709/223 |
| 7,039,856 B2 * | 5/2006 | Peairs et al. | 715/200 |
| 7,043,492 B1 * | 5/2006 | Neal et al. | 1/1 |
| 7,062,466 B2 | 6/2006 | Wagner et al. | |
| 7,092,914 B1 * | 8/2006 | Shear et al. | 705/67 |
| 7,110,983 B2 * | 9/2006 | Shear et al. | 705/55 |
| 7,143,066 B2 * | 11/2006 | Shear et al. | 705/54 |
| 7,290,061 B2 * | 10/2007 | Lentini et al. | 709/246 |
| 7,382,895 B2 | 6/2008 | Bramblet et al. | |
| 7,403,925 B2 * | 7/2008 | Schlesinger et al. | 705/64 |
| 7,454,397 B2 * | 11/2008 | Ocke | 706/47 |
| 7,467,414 B2 * | 12/2008 | Schlesinger | 726/27 |
| 7,472,388 B2 | 12/2008 | Fukunari et al. | |
| 7,496,567 B1 | 2/2009 | Steichen | |
| 7,673,234 B2 * | 3/2010 | Kao et al. | 715/255 |
| 7,890,642 B2 | 2/2011 | Jones et al. | |
| 2001/0037328 A1 * | 11/2001 | Pustejovsky et al. | 707/3 |
| 2002/0099952 A1 * | 7/2002 | Lambert et al. | 713/200 |

(Continued)

*Primary Examiner* — Thanh-Ha Dang (74) *Attorney, Agent, or Firm* — Dergosits & Noah LLP; Todd A. Noah (57) ABSTRACT

An object classification system is provided that receives, from a user, at least one piece of information relating to the object, wherein the information does not directly specify a classification for the object, and that applies at least one rule that classifies the object based, at least in part, on the at least one piece of information received from the user. The techniques described herein also enable classifying an object by, in response to a request from at least one application to access the object, applying at least one rule that dynamically classifies the object.

15 Claims, 9 Drawing Sheets

U.S. PATENT DOCUMENTS

| | | |
|---|---|---|
| 2003/0023575 A1 | 1/2003 | Shlain et al. |
| 2003/0050994 A1* | 3/2003 | Pollack ............................ 709/217 |
| 2003/0167269 A1* | 9/2003 | Gupta ................................. 707/9 |
| 2003/0182583 A1* | 9/2003 | Turco ............................... 713/201 |
| 2003/0196108 A1* | 10/2003 | Kung ............................... 713/200 |
| 2003/0217052 A1* | 11/2003 | Rubenczyk et al. ................ 707/3 |
| 2003/0236845 A1* | 12/2003 | Pitsos ............................. 709/206 |
| 2004/0139059 A1* | 7/2004 | Conroy et al. ....................... 707/3 |
| 2004/0162795 A1* | 8/2004 | Dougherty et al. ............... 706/20 |
| 2004/0186809 A1* | 9/2004 | Schlesinger et al. .............. 705/50 |
| 2004/0186836 A1* | 9/2004 | Schlesinger ......................... 707/9 |
| 2005/0138079 A1* | 6/2005 | Liu et al. ...................... 707/104.1 |
| 2005/0262572 A1* | 11/2005 | Yoneyama ....................... 726/27 |
| 2006/0004819 A1 | 1/2006 | Claudatos et al. |
| 2006/0004820 A1* | 1/2006 | Claudatos et al. ............. 707/101 |
| 2006/0026210 A1* | 2/2006 | Vaszary et al. ................. 707/200 |
| 2006/0031938 A1* | 2/2006 | Choi ................................ 726/25 |
| 2006/0047617 A1* | 3/2006 | Bacioiu et al. ................... 706/59 |
| 2006/0085469 A1* | 4/2006 | Pfeiffer et al. ................. 707/102 |
| 2006/0107200 A1* | 5/2006 | Ching ............................ 715/513 |
| 2006/0117388 A1* | 6/2006 | Nelson et al. .................... 726/25 |
| 2006/0230288 A1* | 10/2006 | Fox et al. ........................ 713/188 |
| 2007/0100793 A1 | 5/2007 | Brown et al. |
| 2007/0130231 A1 | 6/2007 | Brown et al. |
| 2008/0270174 A1* | 10/2008 | Schlesinger et al. ............... 705/1 |

* cited by examiner

RULE TABLE

| Rule ID | Classification ID | State | Question/Final Response |
|---|---|---|---|
| Rule 1 | - | Incomplete | Topic |
| Rule 2 | Classification 2 | Preliminary | Region |
| Rule 3 | Classification 1 | Final | Human Rights |
| Rule 4 | - | Incomplete | Market |
| Rule 5 | Classification 3 | Final | North Korea Nuclear |
| Rule 6 | Classification 3 | Final | Iran Nuclear |
| Rule 7 | Classification 2 | Final | England Nuclear |
| Rule 8 | Classification 1 | Final | NYSE |
| Rule 9 | Classification 1 | Final | AMEX |
| Rule 10 | Classification 2 | Final | NASDAQ |

CLASSIFICATION TABLE

| Classification ID | Name | Description |
|---|---|---|
| Classification 1 | Confidential | - |
| Classification 2 | Secret | - |
| Classification 3 | Top Secret | - |

RESPONSE TABLE

| Response ID | Rule ID | Response Text | Next Rule |
|---|---|---|---|
| Response 1 | Rule 1 | Nuclear | Rule 2 |
| Response 2 | Rule 1 | Human Rights | - |
| Response 3 | Rule 1 | Economy | Rule 4 |
| Response 4 | Rule 2 | North Korea | - |
| Response 5 | Rule 2 | Iran | - |
| Response 6 | Rule 2 | England | - |
| Response 7 | Rule 4 | NYSE | - |
| Response 8 | Rule 4 | AMEX | - |
| Response 9 | Rule 4 | NASDAQ | - |

ANSWER TABLE

| Object ID | Rule ID | Response ID | User ID |
|---|---|---|---|
| File 1 | Rule 1 | Response 1 | John Smith |
| File 1 | Rule 2 | Response 4 | John Smith |

OBJECT TABLE

| Object ID | Object Name | Description | Date Registered | Persistence | State |
|---|---|---|---|---|---|
| File 1 | Nuke2006.doc | Nuclear Report 2006 | 12/03/06 | No | Rule 5 |

FIG. 9

METHODS AND APPARATUS FOR CLASSIFYING OBJECTS

RELATED APPLICATIONS

This application claims priority under 35 U.S.C. §119(e) to U.S. Provisional Application Ser. No. 60/752,133, entitled "METHOD AND SYSTEM FOR CLASSIFYING OBJECTS BY ASKING SCRIPTED QUESTIONS AND RECORDING ANSWERS," filed on Dec. 20, 2005, which is incorporated herein by reference in its entirety.

FIELD OF THE INVENTION

The present application relates to methods and systems for classifying objects (e.g., documents, spreadsheets, database records, video files, audio files, emails and other types).

BACKGROUND OF INVENTION

Manual and automatic classification systems exist that can classify objects, examples of which can include documents, spreadsheets, and database records. Manual classification systems require that an information security officer or information user directly classify objects. Conversely, automatic classification systems can classify an object automatically based on one or more classification rules (e.g., by scanning the contents of an object for key terms and determining the classification based on terms found in the object).

BRIEF DESCRIPTION OF DRAWINGS

In the drawings, in which like reference numerals represent like elements.

DETAILED DESCRIPTION

Applicants have appreciated that manual classification systems are prone to inaccuracy, since often times, the classifier may be unsure as to which classification should be used. Also, classification procedures may change and previous classification may be rendered incorrect. Automatic classification may be limited in terms of what information is available automatically to classify objects without any input from users.

Methods and systems presented herein relate to a classification system that classifies objects by asking an information user one or more questions about the object. The questions about an object can be discrete in nature (e.g., having predefined possible responses) and may be simple so that the user is more likely to answer the questions without inaccuracy. Once information about an object has been gathered, a rule may be applied that classifies the object based, at least in part, on the information gathered from the user.

In one embodiment, the system can dynamically classify an object in response to a request to access the object. This dynamic classification can be done in any suitable way. In one embodiment, it may be performed by applying a rule that considers information about the object gathered by querying a user as discussed above. In one embodiment, answers can be retained so that if the classification rules are changed a new classification can be readily determined based on previously provided, information.

The techniques described herein can be used to classify objects of any type, including but not limited to documents, spreadsheets, database records, video files, audio files, emails and other types. The object may be any item that can be classified by the system. The resulting classification may be used for any purpose (e.g., to determine security policy and/or information workflow), as the techniques described herein are not limited in this respect.

In one embodiment, the classification system allows an administrator (e.g., an information security officer) to specify one or more rule-sets to classify one or more objects. A rule-set may include a list of questions and rules that can determine how to classify objects based on a list of answers (referred to as an answer-set) provided to the questions. In some embodiments, an answer-set may be provided by multiple users over the lifetime of the object. If the answer-set is incomplete, preliminary classification may be performed where possible based on the available answers.

In an illustrative embodiment, the classification system can include a data store that stores rule-sets and answer-sets, and an expert system that can determine object classification based on the rule-set and answer-set. In another embodiment, the data store may further include meta data that is derived from sources other than the user and is further analyzed by the expert system when classifying an object. The system may include one or more user interfaces that allow an administrator (e.g., an information security officer) to create or edit a rule-set, answer questions about an object, and/or view object specific data including answer-sets and object classifications. The system may comprise hardware, software, or a combination thereof, as the techniques presented are not limited in this respect.

The rule-set and answer-set can take any suitable form. In one embodiment, the rule-set can be a data set that can include questions, possible responses, and classification rules that classify an object based on the answers, and the answer-set can be a data set including answers for a given object. Object metadata may be used by the system to keep track of the object classification, where the objects may be identified by a unique identifier.

The administrator (e.g., an information security officer) that defines the questions to be asked about the object and the rules to classify the objects (e.g., the classification rule-set) can be an individual or entity that is responsible for the management of objects to be classified. The administrator (e.g., the information security officer) may be responsible for defining the classification rules so that the system can obtain information and classify the object. In one embodiment, the administrator may also choose to enforce access control on some or all of the objects based on the object classification. An example of access control may involve limiting access to an object that is classified as top secret or confidential, such that the object can only be accessed by individuals with an appropriate access level. However, the individual responsible for creating the rule-set and/or the classification system may be separate from any system that performs an action (e.g., security control) based on the result of the classification of an object.

The classification system can include a user interface that allows for the creation and, in one embodiment, editing of a classification rule-set in any suitable way, e.g., by allowing one or more administrators to enter questions, possible responses, and classifications.

Once the classification rule-set has been entered, the system is capable of classifying objects that may be registered with the system. The techniques disclosed herein are not limited to systems that manage object classification in any particular manner. In one embodiment, any user of the object (e.g., object author, collaborator, editor, reviewer, or viewer) may register objects to be classified by the system. Alternatively, an administrator (e.g., the same administrator who created the rule-set or another) may register objects for classification. Any individual that can answer classification questions about the object may be allowed to classify an object, or object registration may be more tightly controlled, as the techniques described herein are not limited in this respect. The answering of classification questions may be performed during the process of creating an object and registering it with the system, or during subsequent interaction (e.g., viewing, editing) with the object. Individuals authorized to update or append answers for an object may be controlled by policy (e.g., a policy that may be specified by an administrator such as an information security officer).

The system can include a user interface that can allow a user to be prompted for and provide information about an object. Information can be gathered in any suitable way, as the techniques presented herein are not limited in this respect. In one embodiment, the user interface can prompt the user to answer questions about the object, and the answers may be stored in the system and associated with the object. Questions presented to the user may be determined by the classification rule-set, and a follow-up question may be determined based on the answers provided to one or more previously asked questions.

Information about object need not all be provided in one session, and information about the object may be supplemented with additional information provided at a later time. In one embodiment, when an object already has associated answers, users can utilize a user interface to enter additional information about the object, thus extending the answer-set.

Based on the rule-set and provided answers, an expert system can classify the object. Classification may be performed at any time. For example, classification may be performed when an object is registered with the system or deferred until the classification result is needed (e.g., just-in-time-classification), for example when an application is accessing the object.

In one embodiment, the classification system may collect information from the environment (e.g., computer network) and the rule-set can process that collected information along with the information provided by the user to classify an object. The information can be collected and stored with the information provided by the user (e.g., as an answer-set) or may be collected later (e.g., in response to a dynamic classification). The use of questions and answers is just one way of gathering information about an object from a user, as the techniques presented herein are not limited in this respect.

As discussed above, the classification may be used for any desired purpose. In one embodiment, it may be an end goal where a user may be able to lookup the classification of an object. In other embodiments, the classification may be used to automatically take other actions, e.g., to protect and apply a specific access policy to the object, to affect business process workflow for the object, etc.

In another embodiment, the system may be used for the collection of audit information, where one or more of the questions are used to record access behavior, such as which user is accessing the object, when they are accessing the object, etc. For audit collection purposes, some of the answers may be automatically determined by the system (e.g., by automatically gathering user information and date/time of access) and the resulting answer-set may be the audit information.

The techniques described above can be implemented in any suitable manner and are not limited to any particular implementation techniques. Examples are provided below merely for illustration, as other implementations are possible.

Figure 1:
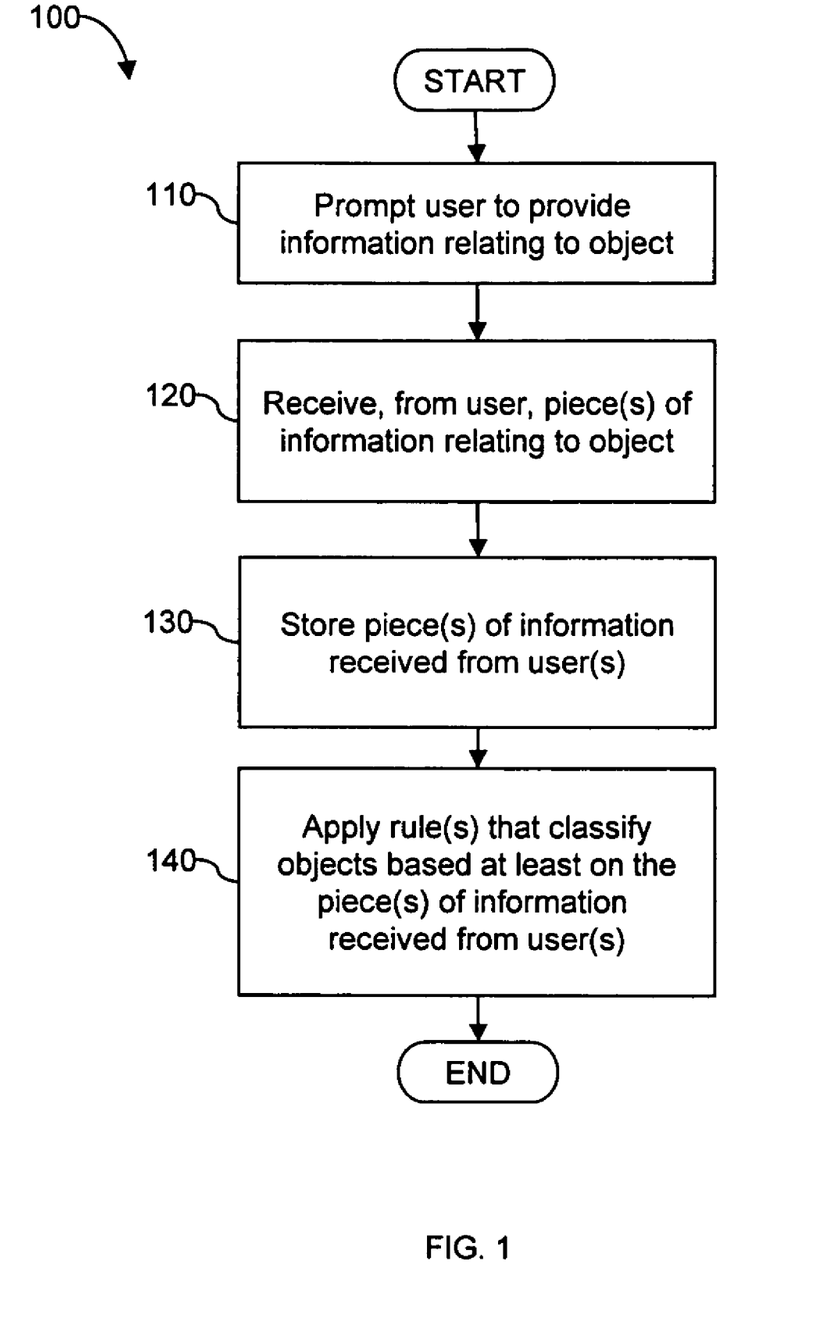
FIG. 1 is a flowchart of a process for obtaining information about an object from a user and using the information to classify the object based on a rule-set in accordance with one embodiment.

FIG. 1 is a flowchart of an illustrative process 100 for obtaining information about an object from a user and using the information to classify the object based on a rule-set in accordance with one embodiment. Process 100 may be performed by a classification system that may include software, hardware, and/or a combination thereof. Process 100 may be performed on solely one computer, or can be distributed amongst multiple computers in any suitable manner.

Process 100 may be called in any suitable manner. In one embodiment, process 100 is called in response to a user attempting to register an object with the classification system. Initially, the process begins in act 110, wherein the user is prompted to provide information relating to the object. A user interface may be provided to the user to enable the user to provide the information relating to the object. As mentioned above, the user interface may request information from the user in any suitable manner. For example, the user interface can ask the user one or more questions about the object, and a number of possible answers may be provided with each question for the user to select from. The user may select the most appropriate answer for each question and the system may determine which subsequent question to ask based on the previous answer(s) provided by the user. In this manner, the process may receive, from the user, one or more pieces of information relating to the object in act 120. The piece(s) of information received by the system may relate to the object but, in one embodiment, may not directly specify a classification for the object.

In the embodiment described above, the pieces of information are provided in the form of answers to questions. However, it should be appreciated that the information may be provided and received in other forms, such as a list of object attributes selected by the user from a list of possible attributes presented to the user via a user interface, via open-ended questions without answers to select from, or in some other way.

In act 130, the process may store the pieces of information relating to the object that were provided by the user. The pieces of information relating to the object may be stored as an answer-set, for example in a database with an accompanying unique object identifier, or in any other suitable way. The answer-set may be stored so that the information relating to the object may be used at a future time for any desired reason to re-classify the object if the rule-set that specifies object classification is modified (or otherwise). In another embodiment, stored information can be used for dynamic classification in response to a request to access the object.

In act 140, to determine the classification, the process may apply a classification rule-set that can determine a classification for the object based, at least in part, on the information provided by the user. For example, the answers provided by the user (e.g., in response to questions) may be used to determine the classification of the object based on the rules within the rule-set. In one embodiment, the object classification may be stored for later use, for example in a database with an accompanying unique object identifier or in any other suitable way. The object classification may then be retrieved as needed, for example, when the object is being accessed and a classification is needed for access control, business process workflow for the object (examples of which include selectively performing operations such as archiving or backup based on object classification), or some other purpose. In another embodiment, the resulting classification is not stored and rule(s) can be applied dynamically whenever classification is needed. After the classification is performed, the process may terminate.

Process 100 is just one example of a process by which a system can receive information relating to an object and apply one or more rules to determine the classification of the object based at least partially on the received information. It should be appreciated that information relating to the object and used to classify the object may be provided by more than one user. Users may each provide some information, for example in the form of answers to questions, and classification may be performed using the combined responses from multiple users. In one embodiment, information may also be automatically gathered without being received from a user. Automatic gathering of information may involve obtaining information about an object from the computer environment. Examples of such other information that can be gathered include the date/time the object was created or last edited, the identification of the user who created the object or last edited the object, the type of the object (e.g., document type), or other object attributes. Alternatively, or additionally, automatic gathering may involve obtaining information about the object from the contents of the object. For example, the contents of the object may be examined to determine the type of object, or to glean information about the content of the object (e.g., whether one or more key terms are present within the object that may influence classification). These are merely examples of gathered information that can used to supplement user supplied information, as other types of information can be gathered.

In FIG. 1, acts can be performed in other orders. For example, storing user provided information can be performed after classifying the object.

In addition, in one embodiment, classifying the object is done only dynamically when the object is accessed. In that embodiment, the process may store information provided by user(s) and then the process (or a separate one) can be utilized to apply the rule-set to the answer-set at a later time (e.g., when the object is accessed) to classify the object.

Figure 2:
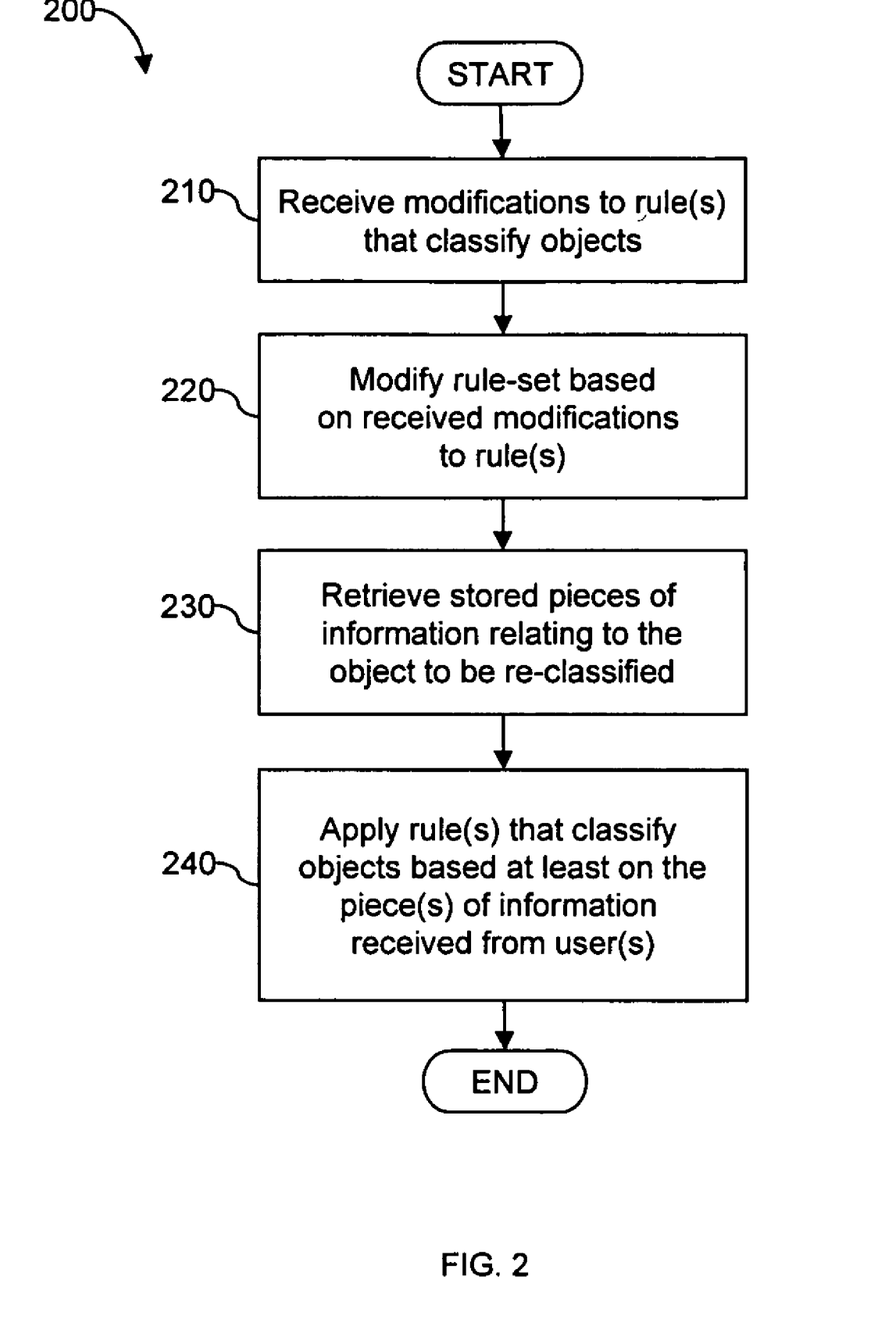
FIG. 2 is a flowchart of a process for re-classifying an existing object using stored information previously provided by one or more users in accordance with one embodiment.

As discussed above, in accordance with one embodiment, information relating to an object may be retained so that a re-classification may be performed when the classification rule-set is modified. FIG. 2 is a flowchart of an illustrative process 200 for re-classifying previously classified objects using stored information previously provided by one or more users. Process 200 may be performed by a classification system that may include software, hardware, and/or a combination thereof. As should be appreciated, process 200 need not be performed on solely one computer, and can be distributed amongst multiple computers.

Process 200 may be called in any suitable manner. In one embodiment, it is called in response to an administrator (e.g., an information security officer) modifying the classification rule-set. Alternatively, or additionally, process 200 may be initiated in response to a re-classification procedure that involves updating the classification of existing objects. The re-classification procedure may be initiated by an administrator (e.g., an information security officer) or other authorized user and/or may be automatically initiated by the system, for example in response to a scheduled re-classification procedure. In embodiments where dynamic classification is performed, re-classification may be performed upon the next access request for an object.

Initially, the process may begin in act 210, wherein modifications to the classification rule(s) may be received. The modifications to one or more rules may be provided by an administrator (e.g., the information security officer) via a user interface that allows for the viewing and modification of the rules, or in any other suitable way. In the embodiment where information relating to objects is gathered by presenting questions to user(s), the modifications to the rules may involve the modification, addition and/or removal of questions used to obtain information about objects, the possible responses to the questions, classification types, and/or the classification associated with one or more answers.

It should be appreciated that changing the questions asked may impact objects already registered with the classification system, as no answer to a new question may have been provided. This can be handled in numerous ways, as the techniques described herein are not limited in this respect. In one embodiment where dynamic classification is performed, when classifying an object where no answer to a question has been provided, a flag can be raised requiring an administrator or user to provide an answer. In another embodiment, when a new question is added a default answer may be associated with the question. The default answers can be used later on to determine object classification even if a user has not provided an answer, as may be the case if re-classification is performed after the classification rules are modified and before a user has responded to any newly added classification questions.

In another embodiment, modifying the rule-set may not include changes to information requests, but to the logic applied to information about the object (e.g., information provided by the user and/or gathered from the environment) so as to classify objects. In act 220, the process may modify the classification rule-set based on the received modifications to the rule(s). One or more objects may be re-classified based on the revised rule-set.

Reclassification may be triggered in any of numerous ways. For example, the re-classification may be performed for each object registered with the system, for only one or more objects that are to be re-classified as may be specified by the administrator (e.g., information security officer), or in the embodiment relating to dynamic classification, when an object is accessed. To perform the re-classification of objects, the process may retrieve the stored pieces of information (e.g., answers to questions posed to users) relating to objects in act 230. The modified rule(s) may be used to determine the classification of the objects. Upon applying the rule(s) to classify an object (act 240), if an answer to a newly added question is not available, the process may use a default answer to determine the classification, or the user may be prompted to provide an answer, as discussed above. Upon determining the classification of the one or more object that are to be re-classified, the updated classifications may be stored and/or used, as previously described. The process may then terminate.

It should be appreciated that process 200 is just one example of a process by which a system can re-classify objects, as the techniques presented are not limited in this respect. It should be appreciated that object re-classification may also be performed using information automatically gathered, in addition to stored information previously provided by user, as discussed above.

In accordance with one embodiment, object classification may be performed in response to a request to access the object. Referred to herein as dynamic classification, this allows for object classification to be determined when objects are accessed and stored classifications need not necessarily be employed. Dynamic classification can enable object classification to occur when such classification is to be used, rather than performing pre-classification of all objects managed by the system.

Figure 3:
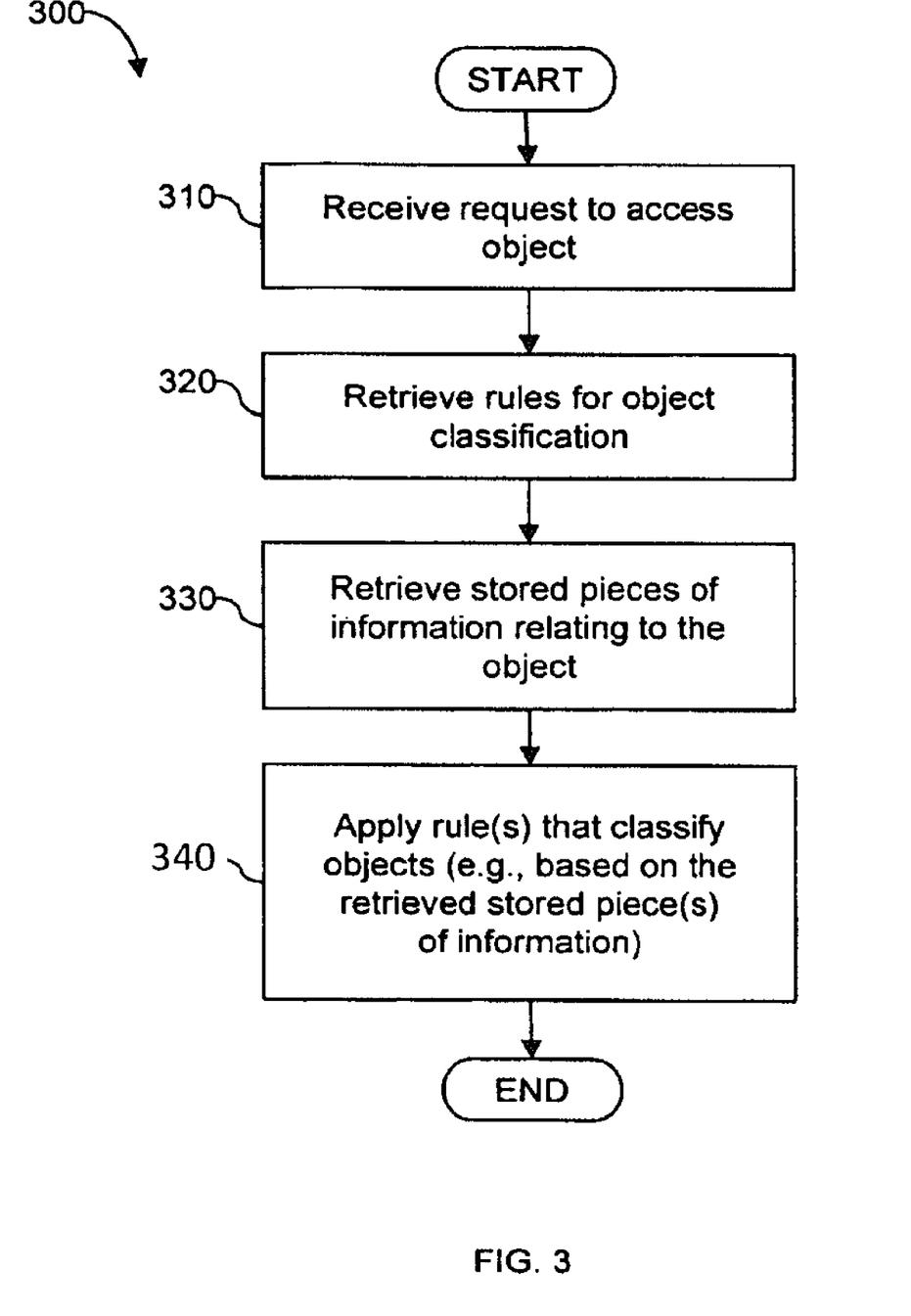
FIG. 3 is a flowchart of a process for dynamically classifying an object in response to a request to access the object in accordance with one embodiment.

FIG. 3 is a flowchart of an illustrative process 300 for dynamically classifying an object in response to a request to access the object. Process 300 may be performed by a classification system that may include software, hardware, and/or a combination thereof. Process 300 need not be performed on solely one computer, and can be distributed amongst multiple computers.

Initially, the process may begin in act 310, wherein a request to access an object may be received. The request to access the object may be provided by an application program attempting to access the object, or from any other source. For example, a user interacting with the application program may be initiating the attempted access of the object (e.g., to view the object) or access to the object may be requested from the operating system level, etc. The techniques presented herein are not limited to the triggering of a dynamic classification based on any particular type of access.

Upon receiving a request to access the object, the process may retrieve the classification rule-set in act 320. The process may also retrieve stored pieces of information relating to the object in act 330. The stored pieces of information may have been previously provided by one or more users (e.g., in response to questions posed by the system) and/or gathered from the environment. If access to only one object is being requested, only stored information relating to that object need be retrieved. However, it should be appreciated that the information stored about other objects may be retrieved, as the techniques described herein are not limited in this respect.

In act 340, the rules provided in the classification rule-set may then be used to classify the object based on the retrieved information in act 330 and/or on information gathered from the environment. It should be appreciated that process 300 is just one example of a process by which a system can dynamically classify objects, as the techniques presented are not limited in this respect.

The classification for the object for which access was requested may then be used in any suitable manner, as the techniques herein are not limited to use with systems that use the classification information in any particular way. In some embodiments, the classification is used to determine access control for the object for which access was requested. For example, access to the object may be granted only if the access level assigned to the requesting application and/or user is high enough for the determined classification, as may be set by policy (e.g., set by an administrator such as the information security officer). Alternatively, other actions may be taken based on the classification.

To illustrate a classification system that incorporates one or more of the techniques described herein, an example of a classification rule-set is described below. As should be appreciated, such a rule-set may be implemented in any way. The example presented below is provided merely for illustrative purposes and describes the use of database tables that may be accessed (e.g., by an expert system) to determine the classification of an object. However, the classification rule-set may be implemented in other ways.

Figure 4:
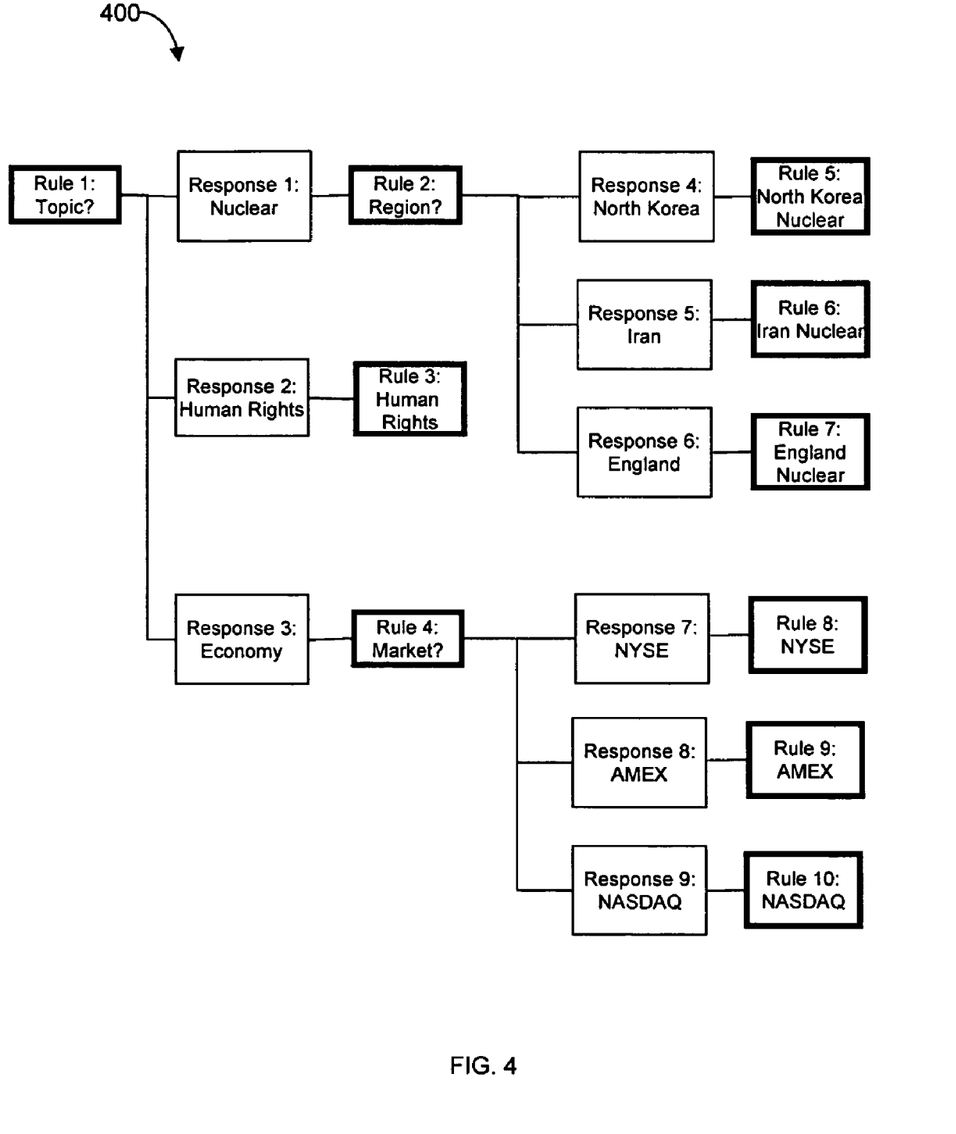
FIG. 4 is a schematic representation of an illustrative example of a classification rule-set and possible responses in accordance with one embodiment.

FIG. 4 a schematic representation 400 of an illustrative example of a classification rule-set. The schematic representation 400 is presented as a tree structure showing the relation between questions and possible responses. Each question and leaf node of the tree structure is represented as a rule. When an object is registered with the system, one or more questions may be posed to the user registering the object. For example, for the classification rule-set example shown in FIG. 4, a first question asked is what topic does the object relate to (as indicated by Rule 1). The user may be presented with multiple possible responses. In the example presented, the possible responses include "Nuclear," "Human Rights," and "Economy," which are referred to as Responses 1, 2, and 3, respectively. The user may select one of the possible response as the answer to the topic question. Upon selecting a response, referred to as the answer, the system may proceed to the next question that should be posed to the user. In the example presented, if the answer is Response 1 or Response 3, another question is posed to the user. If the answer is Response 2, the system proceeds to Rule 3. As presented in this example, Rule 3 does not result in another question being asked, but rather specifies an attribute for the object, namely that the object relates to the classification "Human Rights."

If the answer to the Rule 1 question is Response 1, the system proceeds to ask the Rule 2 question, namely what region does the object relate to. Possible answers the user may choose include "North Korea," "Iran," and "England," referred to as Responses 4, 5, and 6, respectively. In this example, if the user answers by selecting Response 4, the system proceeds to Rule 5. As presented in this example, Rules 5, 6, and 7 do not result in another question being asked, but rather specify an attribute for the object, namely that the object relates to the classifications "North Korea Nuclear," "Iran Nuclear," and "England Nuclear," respectively.

If the answer to the Rule 1 question is Response 3, the system proceeds to ask the Rule 4 question, namely what market does the object relate to. Possible responses from which the user may answer with include "NYSE," "AMEX," and "NASDAQ," referred to herein as Responses 8, 9, and 10. As presented in this example, Rules 8, 9, and 10 do not result in another question being asked, but rather specify an attribute for the object, namely that the object relates to the classifications "NYSE," "AMEX," and "NASDAQ," respectively. Although not shown in the example of FIG. 4, one of the possible answers to one or more questions may include "Other" or "None of the Above," so as to account for situations where an object does not relate to any of the specific responses provided to a user.

The above-described classification rule-set and the answer-set for objects each may be stored using any suitable data schema, as techniques described herein are not limited in this respect. In one embodiment, the rule-set and answer-set for each object is stored as tables in a database, although other schemas are possible. FIGS. 5-9 illustrate possible entries in such tables for the rule-set of FIG. 4 and an object classified according to it. It should be appreciated that such tables may be used with any classification rule-set and answer-set, and that rule and answer-sets may be stored using data schemes other than database tables organized as described herein, as the techniques presented herein are not limited to any particular implementation.

Figure 5:
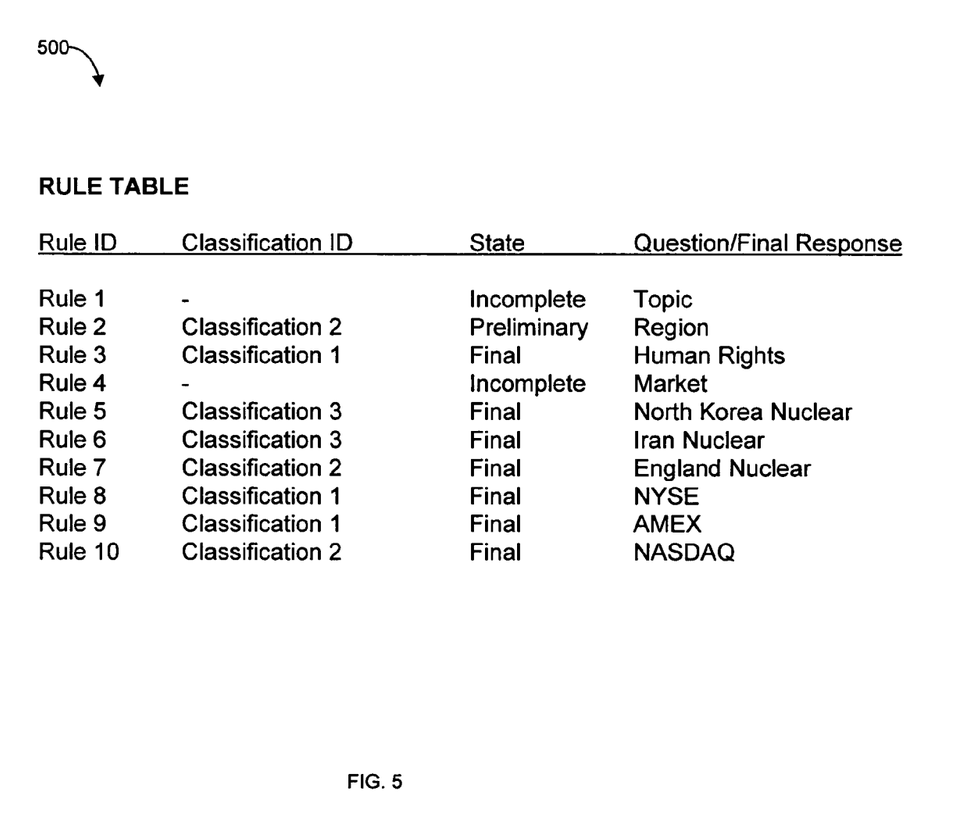
FIG. 5 is an illustrative example of a rule table for the example of FIG. 4 in accordance with one embodiment.

FIG. 5 is an illustrative example of a rule table 500 that can implement the rule-set of FIG. 4 in accordance with one embodiment. The rule table 500 can include a rule ID field, a classification ID field, a state field, and/or a question (or final response) description field. The rule ID can be any identifier used to uniquely refer to the corresponding rule. For example, for the rule table 500, the rule IDs are "Rule 1," "Rule 2," "Rule 3," . . . "Rule 10." The classification ID can be any identifier used to indicate the classification associated with a rule. For example, for the rule table 500, Rules 2, 3, and 5-10 result in a preliminary or final classification, whereas Rules 1 and 4 do not result in any classification as further answers are needed to define a classification. The state can be an identifier that indicates whether the classification resulting from the rule is final, preliminary, or incomplete. If the state is final, no other question is posed to the user. If the state is preliminary, further questions may be asked to refine a current classification. In the example presented, Rule 2 has an associated preliminary classification. If the classification is incomplete, no classification is available, for example, as a result of insufficient information having been provided. In the example presented, Rules 1 and 4 have an associated incomplete state and more information from answers to further questions is needed to define a classification.

Figure 6:
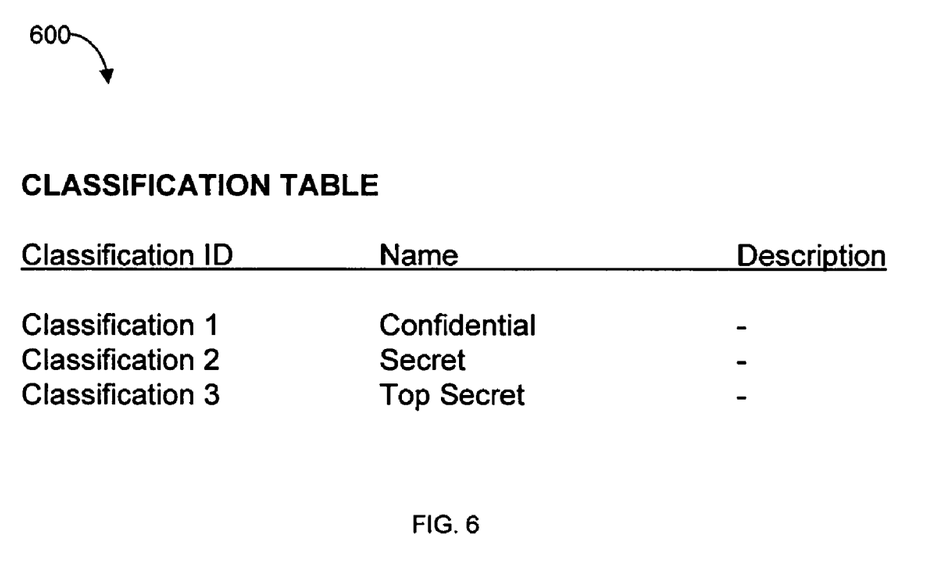
FIG. 6 is an illustrative example of a classification table for the example of FIG. 4 in accordance with one embodiment.

FIG. 6 is an illustrative example of a classification table 600 that can specify various possible classifications for objects in accordance with one embodiment. The classification table 600 can include a classification ID field, a name field, and a description field. The classification ID can be any identifier that uniquely identifies the classification. For the classification table 600, the classification IDs include "Classification 1," "Classification 2," and "Classification 3." The names corresponding to each classification ID include "Confidential," "Secret," and "Top Secret." The description field may include a description of the classification as may be provided by an administrator to facilitate an appreciation of the various classifications over and above what may be gleaned from the name. In the example presented, only three classifications are shown, however, the number of classifications may be more or less than the number illustrated, as the techniques described herein are not limited in this respect.

Figure 7:
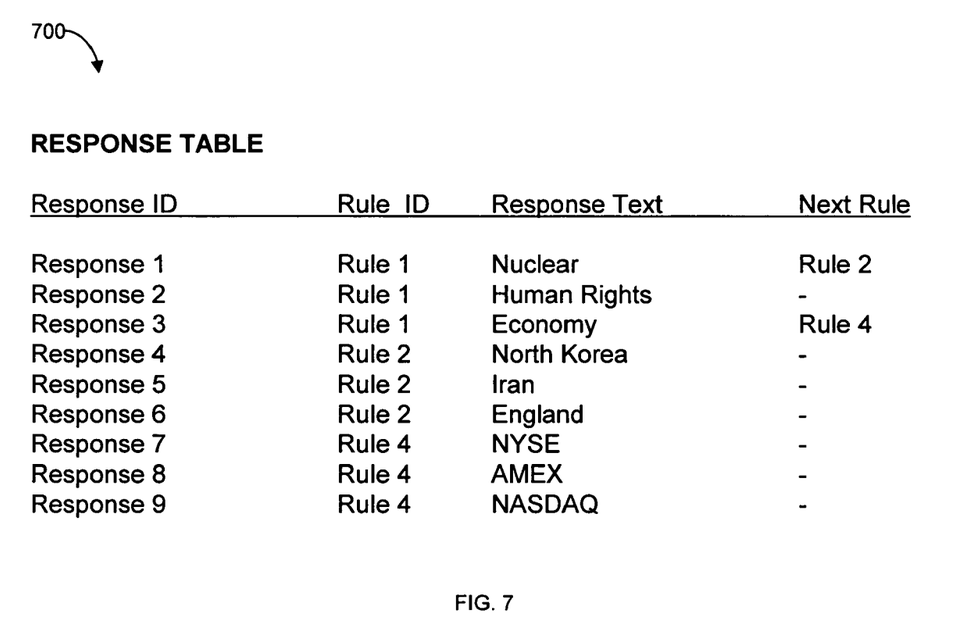
FIG. 7 is an illustrative example of a response table for the example of FIG. 4 in accordance with one embodiment.

FIG. 7 is an illustrative example of a response table 700 that facilitates implementation of the illustrative rule-set of FIG. 4 in accordance with one embodiment. The response table 700 may include a response ID field, a rule ID field, a text field, and a next rule field. The response ID may be any identifier used to uniquely refer to the responses. The rule ID may be a rule identifier that specifies the rule (and associated question) for which the corresponding response is one possible response. For example, Responses 1, 2, and 3 are possible responses to the question associated with Rule 1. The response text is a description of the response that may be presented to a user for selection. The next rule field includes an indication of the next rule that should be processed if a given response is received as an answer provided by the user. For example, in the response table 700, Response 1 results in Rule 2 being processed next, and Response 3 results in Rule 3 being processed next.

The above-mentioned tables, including the rule table 500, the classification table 600, and the response table 700 may be provided to define the classification rule-set in accordance with one embodiment. These tables may be defined by an administrator (e.g., an information security officer) in any suitable way. For example, the administrator may directly populate the tables via a user interface and/or define a classification tree (as shown for the example of FIG. 4) via a graphical user interface that may be processed by code executed by the system to populate the database tables.

The tables above implement the rule-set and are not specific to the information gathered to classify any particular object. The information gathered for particular objects can be stored in any suitable data structures, as the techniques described herein are not limited to any particular implementation of storing the information. In one embodiment, one or more tables may be populated and/or updated based on answers provided by a user registering an object and/or providing additional information about an already registered object. In one embodiment, these tables may include an answer table and an object table as described below.

Figure 8:
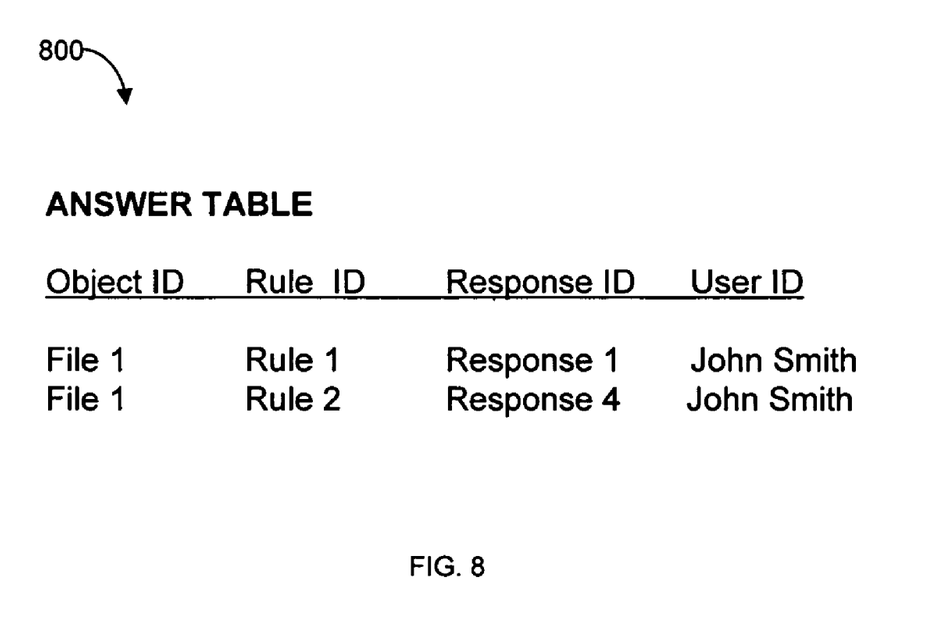
FIG. 8 is an illustrative example of an answer table for the example of FIG. 4 in accordance with one embodiment.

FIG. 8 is an illustrative example of an answer table 800 that may be populated when registering an object with a classification system implementing the rule-set of FIG. 4 in accordance with one embodiment. The answer table may include answers provided by one or more users in response to the questions of the rule-set. The answer table 800 may include an object ID field, a rule ID field, a user ID field, and a response ID field. The object ID can be any identifier used to uniquely refer to the corresponding object. In the answer table 800 there are only answers provided for a single object so the object ID for both row entries is "File 1." The object ID may be used to distinguish between entries associated with different objects (not shown). Alternatively, separate tables could be used for each object and the table can identify the object such that there is no need for an object ID entry in the table. The rule ID can be the rule identifier for the corresponding rule for which an answer was provided. The response ID denotes the corresponding answer provided by a user in response to the question of the rule referred to by the rule identifier. The user ID is a unique identifier that identifies the user who provided the response.

Figure 9:
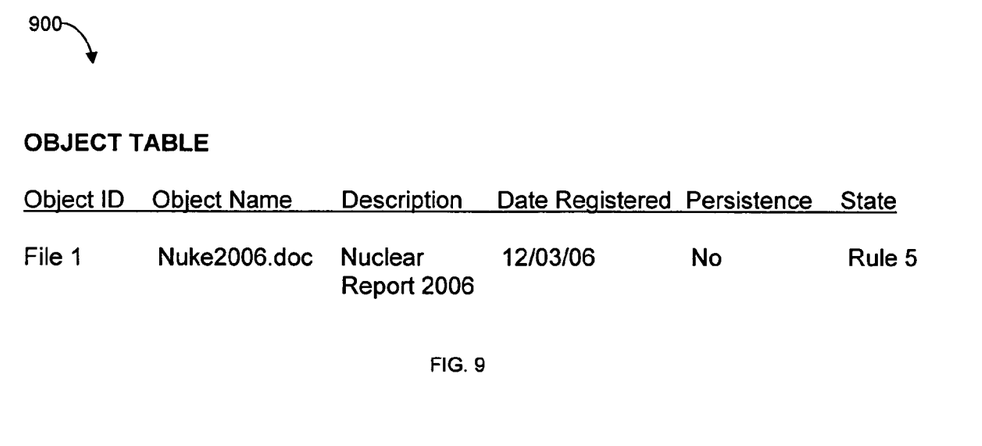
FIG. 9 is an illustrative example of an object table for the example of FIG. 4 in accordance with one embodiment.

FIG. 9 is an illustrative example of an object table 900 in accordance with one embodiment populated for an object registered with a classification system applying the rule-set of FIG. 4 and with the answers given in FIG. 8. The object table 900 includes an object ID field, an object name field, a description field, a date field, a persistence field, and a state field. The object ID can be any identifier used to uniquely refer to the corresponding object. The object name field can be the name of the object, for example the filename when the object is a file. The description can be text that describes the object. The date field can include the date and/or time at which the object was registered with the system. The persistence field can be an indicator that specifies whether a classification rule-set should be applied dynamically each time the object is accessed. The state field includes a rule ID that indicates which rule was last evaluated for the object. When the classification is complete, the state field contains the rule ID of the last rule evaluated which provides an indication of the classification (via the classification ID field of the rule table). When the classification is incomplete, the state field contains the last rule evaluated and can be used as a starting point for further questioning of user(s) so as to obtain more information about the object.

It should be appreciated that the fields presented in the tables of FIGS. 8 and 9 are just exemplary and not all the fields described need be present in the tables, as many of the fields are optional. Furthermore, the table structures of FIGS. 5-9 are just examples of a data schema to implement the classification rule-set of FIG. 4 and other schema are possible. In addition, the classification techniques described herein are not limited to a rule-set of the type shown in FIG. 4, as other implementations are possible.

The techniques presented herein may be implemented in a distributed computer environment (e.g., within an enterprise). The techniques may be implemented as a product or a service. A representative system in which the techniques may be implemented comprises an application server (or any other host), a client machine, and a database management server. Each server may have an associated administrative console. The machines may be connected to one another over a network, such as wide area network (WAN), local area network (LAN), protected network (e.g., VPN), a dedicated network, or some combination thereof. Communications among the various machines may be encrypted or otherwise protected (e.g., via SSL). One or more of the machines may be located behind an enterprise firewall. The application server can support a given resource (e.g., a file, a database, a file system, an application, a computer, a system) to which a user of the client machine desires to access.

The techniques may be implemented with any collection of autonomous computers (together with their associated software, systems, protocols and techniques) linked by one or more networks. The techniques can comprise a set of preferably software-based functions (e.g., applications, processes, execution threads) or firmware-based functions. A given "interface" of the system may be provided using a graphical user interface, a command line interface, or via a network interface such as a Web service.

As should be appreciated from the foregoing, numerous techniques described herein can be used independently of one another. Thus, while in some embodiments all of the above-described features can be used together, any combination or subset of the features described above can be employed together in a particular implementation, as the aspects of the present invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that the various processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium or multiple computer-readable media (e.g., a computer memory, one or more floppy disks, compact disks, optical disks, magnetic tapes, etc.) encoded with one or more programs that, when executed, on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented in connection with any type of network, cluster or configuration. No limitations are placed on the network implementation.

Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed is:

1. A computer-implemented method of classifying an object in an object classification system, the method comprising:
    (A) receiving a first request from at least one user to access the object;
    (B) providing a user interface for prompting the at least one user to provide information relating to the object;
    (C) receiving, from at least one user information relating to the object, wherein the information does not directly specify a classification for the object;
    (D) applying, by at least one computer, at least one security classification rule that classifies the object based, at least in part, on the information received from the at least one user;
    (E) storing the information after applying the security classification rule that classifies the object;
    (F) receiving a second request from the at least one user to access the object; and
    (G) applying, by the at least one computer, in response to the second request from the at least one user to access the object, at least one modified security classification rule to re-classify the object based, at least in part, on the information received from the at least one user.

2. The computer-implemented method of claim 1, wherein (D) is performed in response to a request from at least one application to access the object so that the object is dynamically classified in response to the request to access the object.

3. The computer-implemented method of claim 1, wherein (D) comprises applying at least one security classification rule that classifies the object based, at least in part, on the information received from the user and at least one piece of information automatically gathered without being received from the user.

4. The computer-implemented method of claim 1, wherein (C) is performed in response to a first request from at least one application to access the object, and wherein (G) is performed in response to a second request from the at least one application to access the object.

5. The computer-implemented method of claim 4, wherein the at least one application comprises at least a first application and a second application, wherein (C) is performed in response to a request from the first application to access the object, and wherein (G) is performed in response to a request from the second application to access the object.

6. The computer-implemented method of claim 1, further comprising prompting a user to provide the information about the object in (C) when the object is registered with the classification system.

7. At least one non-transitory computer readable medium encoded with a plurality of instructions that, when executed on a computer system, perform a method for classifying an object in an object classification system, the method comprising:
  (A) receiving a first request from at least one user to access the object;
  (B) providing a user interface for prompting the at least one user to provide information relating to the object;
  (C) receiving, from at least one user information relating to the object, wherein the information does not directly specify a classification for the object;
  (D) applying, by at least one computer, at least one security classification rule that classifies the object based, at least in part, on the information received from the at least one user;
  (E) storing the information after applying the security classification rule that classifies the object;
  (F) receiving a second request from the at least one user to access the object; and
  (G) applying, by the at least one computer, in response to the second request from the at least one user to access the object, at least one modified security classification rule to re-classify the object based, at least in part, on the information received from the at least one user.

8. The non-transitory computer readable medium of claim 7, wherein (D) is performed in response to a request from at least one application to access the object so that the object is dynamically classified in response to the request to access the object.

9. The non-transitory computer readable medium of claim 7, wherein (D) comprises applying at least one security classification rule that classifies the object based, at least in part, on the information received from the user and at least one piece of information automatically gathered without being received from the user.

10. The non-transitory computer readable medium of claim 7, wherein (C) is performed in response to a first request from at least one application to access the object, and wherein (G) is performed in response to a second request from the at least one application to access the object.

11. The non-transitory computer readable medium of claim 10, wherein the at least one application comprises at least a first application and a second application, wherein (C) is performed in response to a request from the first application to access the object, and wherein (G) is performed in response to a request from the second application to access the object.

12. The non-transitory computer readable medium of claim 7, wherein the method further comprises prompting a user to provide the information about the object in (C) when the object is registered with the classification system.

13. At least one computer comprising:
  at least one processor programmed to implement an object classification system that classifies objects, the processor programmed to, receive, from at least one user, information that relates to an object but does not directly specify a classification for the object, apply at least one security classification rule that classifies the object based, at least in part, on the information received from the at least one user, store the information after applying the security classification rule that classifies the object, receive a second request from the at least one user to access the object, and, in response to the second request from the at least one user to access the object, apply at least one modified security classification rule to re-classify the object based, at least in part, on the information received from the at least one user.

14. The computer of claim 13, wherein the processor is programmed to apply the security classification rule that classifies the object in response to a request from at least one application to access the object so that the object is dynamically classified in response to the request to access the object.

15. A computer-implemented method of classifying an object in an object classification system, the method comprising:
  receiving a first request from at least one user to access the object;
  receiving at least one piece of information relating to the object, wherein the information is automatically generated and does not directly specify a classification for the object;
  applying, by at least one computer, at least one security classification rule that classifies the object based on the automatically generated piece of information;
  receiving, from at least one user, information relating to the object, wherein the information does not directly specify a classification for the object;
  storing the information received from the at least one user;
  receiving a second request from the at least one user to access the object; and
  applying, by the at least one computer, in response to the second request from the at least one user to access the object, at least one modified security classification rule to re-classify the object based, at least in part, on the automatically generated information.

* * * * *